(12) United States Patent
Guo et al.

(10) Patent No.: US 11,605,948 B2
(45) Date of Patent: *Mar. 14, 2023

(54) COMMUNICATION-BASED PERMISSIVE PROTECTION SCHEME FOR POWER DISTRIBUTION NETWORKS

(71) Applicant: S&C Electric Company, Chicago, IL (US)

(72) Inventors: Qing Guo, Skokie, IL (US); Yoav Sharon, Evanston, IL (US); Michael Meisinger, Chicago, IL (US)

(73) Assignee: S&C Electric Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/747,586

(22) Filed: May 18, 2022

(65) Prior Publication Data

US 2022/0294215 A1    Sep. 15, 2022

Related U.S. Application Data

(63) Continuation of application No. 16/742,970, filed on Jan. 15, 2020, now Pat. No. 11,374,405.

(60) Provisional application No. 62/804,863, filed on Feb. 13, 2019.

(51) Int. Cl.
  *H02H 3/04* (2006.01)
  *H02J 3/00* (2006.01)
  *H02H 7/26* (2006.01)
  *H02J 13/00* (2006.01)

(52) U.S. Cl.
  CPC ............ *H02J 3/001* (2020.01); *H02H 3/042* (2013.01); *H02H 7/26* (2013.01); *H02J 13/00006* (2020.01)

(58) Field of Classification Search
  CPC ...... H02H 3/006; H02H 3/042; H02H 3/0935; H02H 7/26; H02J 13/00006; H02J 3/001
  See application file for complete search history.

(56) References Cited

U.S. PATENT DOCUMENTS

| | | |
|---|---|---|
| 2009/0290275 A1 | 11/2009 | Staszesky et al. |
| 2010/0152910 A1 | 6/2010 | Taft |
| 2018/0233895 A1 | 8/2018 | O'Regan et al. |
| 2018/0316188 A1 | 11/2018 | Ishchenko et al. |

OTHER PUBLICATIONS

Shen et al.; "Protection Coordination Analysis of Closed-Loop Distribution system"; International Conference on Power System Technology, 2002, pp. 702-706 vol. 2, doi: 10.1109/ICPST.2002.1047488 (Year: 2002).

*Primary Examiner* — Peter M Novak

(57) ABSTRACT

A communication-based permissive protection method for protecting an electrical power distribution network from a fault. The network includes a power source, an electrical line and a plurality of fault interrupters, where the fault interrupters are operable to prevent current flow in response to the fault. The method includes detecting the fault by each fault interrupter that is between the fault and the power source, and sending a drop of voltage message from each fault interrupter that doesn't detect the fault, but does detect a drop of voltage as a result of the fault to its immediate upstream fault interrupter. The method opens the fault interrupter that both detects the fault and receives a drop of voltage message from all of the fault interrupters immediately downstream of that fault interrupter.

14 Claims, 2 Drawing Sheets

COMMUNICATION-BASED PERMISSIVE PROTECTION SCHEME FOR POWER DISTRIBUTION NETWORKS

CROSS-REFERENCE TO RELATED APPLICATIONS

This application is continuation of prior U.S. Pat No. 11,374,405, issued on Jun. 28, 2022, which claims the benefit of priority from the U.S. Provisional Application No. 62/804,863, filed on Feb. 13, 2019, the disclosure of which is hereby expressly incorporated herein by reference for all purposes.

BACKGROUND

Field

The present disclosure relates generally to a communication-based permissive protection method for protecting an electrical power distribution network from a fault. More particularly, the present disclosure relates to a communication-based permissive protection method for opening a fault interrupter in response to detecting a fault in an electrical power distribution network.

Discussion of the Related Art

An electrical grid typically includes power generation plants each having power generators, such as gas turbine engines, nuclear reactors, coal-fired generators, hydro-electric dams, etc. The power plants generate power that is stepped up to a high voltage AC signal provided on high voltage transmission lines that deliver electrical power to substations typically located within a community, where the voltage is stepped down to a medium voltage. The substations provide the medium voltage power to three-phase feeder lines. The feeder lines are coupled to lateral lines that provide the medium voltage to various transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, several times above the normal current, along the fault path. The large amount of current causes the electrical lines to significantly heat up and possibly melt and may cause mechanical damage to various components in the substation and in the network.

Fault interrupting devices, usually referred to herein as fault interrupters, are provided on utility poles and in underground circuits along a feeder line and have a switch to allow or prevent power flow downstream of the fault interrupter. These fault interrupters measure the current and voltage on the feeder line to monitor power flow and look for problems with the network circuit, such as detecting a fault. When a fault is detected, it is desirable that the first fault interrupter upstream from the fault be opened as soon as possible so that the fault is quickly removed from the network to prevent damage to equipment, personal injury, fires, etc., and so that the loads upstream of that fault interrupter are not disconnected from the power source and service is not interrupted to them. It is further desirable that if the first fault interrupter upstream from the fault does not open for whatever reason, then a next fault interrupter upstream from the fault is opened, and so on. In order to accomplish this, it is necessary that some type of communications or coordination protection scheme be employed in the network so that the desired fault interrupter is opened in response to the fault.

One known protection scheme for this purpose is referred to in the art as a time-current characteristic (TCC) coordination scheme. Generally, for a TCC coordination scheme each fault interrupter in a particular series of fault interrupters on a feeder line is assigned a sliding TCC value that defines how fast the fault interrupter will open in response to detecting a fault, where the TCC value is slower for lower currents and is faster for higher currents, and where the sliding value defines a TCC curve. TCC curves with sliding values are typically used in systems where protection consists of both fuses and relayed fault interrupters. In systems without fuses a definite-time TCC is more commonly used. As the fault interrupters are provided farther downstream from the source, they are given faster TCC values so that the first upstream fault interrupter from a detected fault will open before a next up stream fault interrupter from the fault, where the particular fault interrupter will stop timing to its TCC value once a downstream fault interrupter opens and the fault is removed. However, traditional TCC coordination schemes are limited in the number of fault interrupters a feeder line can have because the TCC values cannot be too close together in order for the coordination to be effective. In other words, the number of TCC curves that realistically can be provided is limited. Moreover, fault interrupters closer to the source need to operate relatively slowly.

Another known protection scheme is referred to in the art as a communication enhanced coordination (CEC) protection scheme, where all of the fault interrupters on the feeder line are assigned the same initial TCC curve or definite time response. The CEC scheme includes sending messages between the fault interrupters on a feeder line, where if a certain fault interrupter detects a fault it will send a message to its immediate upstream fault interrupter identifying the fault and stating that the fault is downstream of the sending fault interrupter. When this occurs, the upstream fault interrupter will shift its TCC curve or definite time response to be longer so that it doesn't open at the same time as the sending fault interrupter but will open if the sending fault interrupter doesn't open after its TCC curve or definite time response expires. Therefore, the most downstream fault interrupter that is immediately upstream of the fault will not receive a fault message from a further downstream fault interrupter because the further downstream fault interrupter does not detect a fault, and thus the most downstream fault interrupter that is immediately upstream of the fault will be the one to open first because it is operating on its initial TCC curve or definite time response. If for some reason that fault interrupter does not open, a further upstream fault interrupter will then open that received the fault detection message and is now operating on the longer TCC curve or definite time response. These types of CEC protection schemes do not have the limitations of the traditional TCC schemes referred to above, but their speed may still be limited by the performance of the communication method.

SUMMARY

The following discussion discloses and describes a communication-based permissive protection method for protecting an electrical power distribution network from a fault. The network includes a power source, at least one electrical line, and a plurality of fault interrupters, where the fault interrupters are operable to prevent current flow in response to the fault. The method includes detecting the fault by each fault interrupter that is between the fault and the power source and sending a drop of voltage message from each fault interrupter that doesn't detect the fault but does detect a drop of voltage as a result of the fault to its immediate upstream fault interrupter towards the power source. The method opens the fault interrupter that both detects the fault and receives a drop of voltage message from all of the fault interrupters immediately downstream of that fault interrupter.

Additional features of the disclosure will become apparent from the following description and appended claims, taken in conjunction with the accompanying drawings.

DETAILED DESCRIPTION OF THE EMBODIMENTS

Figure 1:
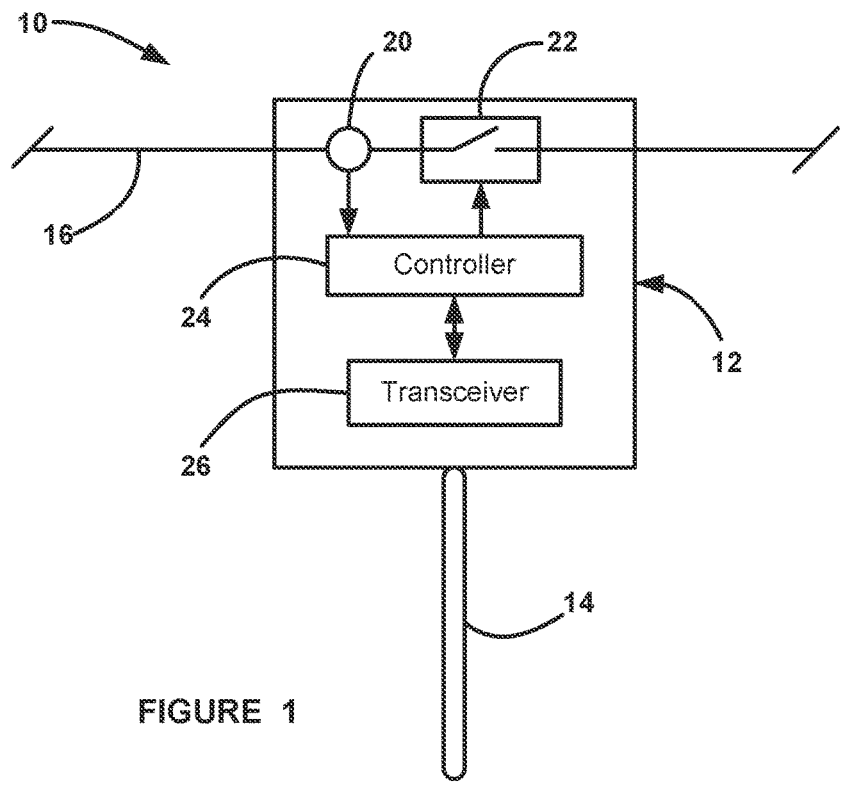
FIG. 1 is a simplified illustration of a fault interrupter in an electrical power distribution network.

The following discussion of the embodiments of the disclosure directed to a communication-based permissive protection method for opening a fault interrupter in response to a detected fault in an electrical power distribution network is merely exemplary in nature and is in no way intended to limit the disclosure or its applications or uses.

As will be discussed in detail below, the present disclosure proposes a communication-based permissive protection scheme for over-current protection on a feeder line that is an enhancement to known communication-based protection schemes. Compared to those protection schemes, the proposed permissive scheme provides additional benefits including a faster interruption of a fault and a faster isolation of sections downstream of the fault leading to faster restoration of those sections. More particularly, when a fault interrupter detects a drop of voltage (DoV) on the feeder line as a result of a fault occurring in the network but does not detect conditions indicating a fault downstream of that interrupter, it sends a DoV message to its immediate upstream fault interrupter. When a fault interrupter detects a fault downstream and receives DoV messages from all of its immediate downstream devices, that fault interrupter is known to be immediately upstream of the feeder line section that is faulted, and it opens immediately to interrupt the fault. It is noted that the most downstream fault interrupter on the feeder line will not receive any DoV messages when there is a fault downstream of it, so it will open immediately when it detects a fault.

The discussion herein refers to detecting a fault somewhere in the power distribution network. It should be noted that the manner in which the fault is detected can be by any suitable fault detection scheme. For example, the fault can be detected by detecting over-current using voltage and current measurements in traditional manners or by other more advanced fault detection schemes, such as impedance protection, voltage-restrained or voltage-controlled protection, etc. It is further noted that the discussion herein talks about radial circuits that have only one connected source. However, the communication-based permissive protection scheme can also apply to non-radial or closed-loop circuits having two or more substation sources and/or circuits with multiple distributed generators. Specifically, if a fault interrupter detects a DoV and a fault on either of its sides, it will send a DoV message to all neighboring fault interrupters in the direction of the fault. The fault side can be determined, for example, by a directional element. A fault interrupter that detects a fault and receives a DoV message from all of its neighboring fault interrupters in the direction of the fault will open. It is also noted that the interrupting device is described herein as a fault interrupter. However, this is merely for descriptive purposes in that the interrupting device can be any device suitable for the purposes described.

In the known communication-based protection schemes, the wait-time before an upstream fault interrupter opens is the maximum possible time of one message passing from one fault interrupter to another fault interrupter, plus the maximum response time of the downstream protection fault interrupter plus a buffer time (safety margin). In the proposed permissive protection scheme, the wait-time before a fault interrupter opens is the actual time of one message passing from the downstream fault interrupter to the upstream fault interrupter when a fault happens between the two interrupters. Therefore, the proposed permissive protection scheme is faster than the known communication-based blocking schemes and overcomes the limitations of communication-based permissive schemes typically used in transmission networks that rely on two sources of fault current to isolate faults. In the proposed scheme, extra time can be added to the message receive time before opening the fault interrupters that use this scheme to accommodate further downstream devices that use traditional TCC coordination, such as lateral fuses. With carefully selected wait times, fault interrupters using the proposed permissive scheme can also coordinate with further upstream devices including relayed circuit breakers and fuses that use traditional TCC coordination. The most downstream fault interrupter can be set so that it opens immediately upon detection of a fault or slightly slower than downstream devices, such as fuses that operate on traditional TCC curves.

FIG. 1 is a simple illustration of a fault interrupter 12 mounted on a utility pole 14 that is part of a medium voltage electrical power distribution network 10. It is noted that the fault interrupters operating as disclosed herein can be employed in underground circuits instead of being on utility poles. Although not specifically shown, the network 10 would include many such fault interrupters distributed over a wide area and would also include many other electrical elements and devices, such as an electrical substation, feeder lines, lateral lines, fuses, loads, transformers, circuit-breakers, etc. The fault interrupter 12 is connected to a power line 16 that is intended to represent a three-phase feeder line. The fault interrupter 12 includes a relay or interrupter switch 22 for opening and closing the fault interrupter 12 to allow or prevent current flow-through on the power line 16. The fault interrupter 12 also includes a sensor 20 that is intended to represent one or more current or voltage sensors for measuring the current and voltage of the power signal propagating on the line 16, a controller 24 for processing the measurement signals and controlling the position of the switch 22, and a transceiver 26 for transmitting data and messages to a control facility (not shown) and/or other fault interrupters and components in the network 10. The configuration and operation of fault interrupters of this type are well understood by those skilled in the art.

Figure 2:
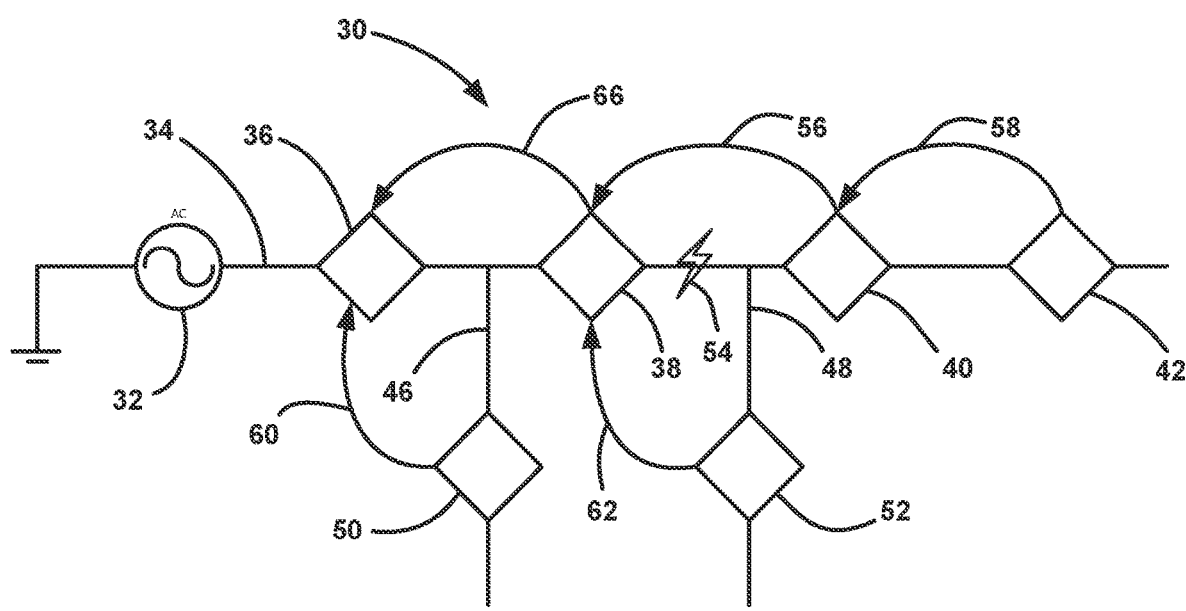
FIG. 2 is a schematic type diagram of an electrical power distribution network including fault interrupters positioned on a feeder line, where a fault is shown on the feeder line, and illustrating a communication-based permissive protection scheme for opening a fault interrupter in response to detecting the fault.

FIG. 2 is a schematic type diagram of an electrical power distribution network 30 including a power source 32, such as a substation, providing power on a feeder line 34, which may or may not be a three-phase feeder line, and fault interrupters, here four fault interrupters 36, 38, 40 and 42, mounted on certain utility poles in the network 30 a certain distance apart and being in electrical series. Two other lines 46 and 48 are coupled to the feeder line 34, and could be three-phase feeder lines or single phase lateral lines, where a fault interrupter 50 is provided in the line 46 and a fault interrupter 52 is provided in the line 48. All of the fault interrupters 36, 38, 40, 42, 50 and 52 are capable of measuring voltage and current on the particular line 34, 46 or 48 and are in communication with each other as discussed above. Further, each of the fault interrupters 36, 38, 40, 42, 50 and 52 also includes a switch that can be opened to prevent power from the source 32 to be delivered downstream of the particular fault interrupter 36, 38, 40, 42, 50 or 52.

During normal operation, the measured voltage by each of the fault interrupters 36, 38, 40, 42, 50 and 52 fluctuates in response to loads being added to and removed from the feeder lines 34, 46 and 48. A fault 54 is shown occurring on the feeder line 34 between the fault interrupters 38, 40 and 52, where all of the fault interrupters 36, 38, 40, 42, 50 and 52 will experience a drop of voltage as a result of the fault 54, but the fault interrupters 36 and 38 between the fault 54 and the power source 32 will also detect the fault 54. In response to the occurrence of the fault 54, each of the fault interrupters 36, 38, 40, 42, 50 and 52 that measures a significant drop of voltage as a result of the fault 54, but does not detect a downstream fault, sends a drop of voltage (DoV) message to its immediate upstream fault interrupter indicating the reduction of voltage. Particularly, in this example, the fault interrupter 40 sends a DoV message to the fault interrupter 38 on communication path 56, the fault interrupter 42 sends a DoV message to the fault interrupter 40 on communication path 58, the fault interrupter 50 sends a DoV message to the fault interrupter 36 on communication path 60, and the fault interrupter 52 sends a DoV message to the fault interrupter 38 on communication path 62. It is noted that the communication paths 56, 58, 60 and 62 are shown to be directly from one fault interrupter to another fault interrupter. However, the communication paths 56, 58, 60 and 62 may be through other devices between the sending fault interrupter and the receiving fault interrupter. The communication paths 56, 58, 60 and 62 are intended to represent any suitable communications, such as wireless, wired, fiber optics, etc. Further, in this example, the fault interrupters 36 and 38 would detect the fault 54 because they are on the feeder line 34 upstream of the fault 54.

The fault interrupter 38 detects the fault 54 and receives a DoV message from all of its downstream fault interrupters, specifically the fault interrupters 40 and 52, and thus, it opens in response to the fault 54 because it knows it is the first fault interrupter upstream of the fault 54. In this scenario, the fault interrupter 36 detects the fault 54, but does not receive a DoV message from all of its immediate downstream fault interrupters, specifically DoV messages from both of the fault interrupters 38 and 50, where the fault interrupter 38 does not send a DoV message because it detects the fault 54, and therefore the fault interrupter 36 does not open. The process takes one message passing time from the fault interrupters immediately downstream of the fault 54 to the fault interrupter 38 immediately upstream of the fault 54, regardless of the location of the fault interrupters on the feeder liner 14.

The proposed communication-based permissive protection scheme can be contrasted to the known CEC protection scheme as follows. In response to the fault 54 for the known protection scheme, the fault interrupter 38 would send a fault detection message to the fault interrupter 36 identifying the fault 54, but no DoV messages are sent. The fault interrupters 36 and 38 would be operating on their TCC curve, where the fault interrupter 38 would open before the fault interrupter 36. Thus, by using the communication-based permissive protection scheme, the fault interrupter 38 would open faster than it would using the CEC protection scheme because it does not need to wait until its TCC curve has expired. It is noted that by using the CEC protection scheme, the TCC curve must consider and be slower than the maximum, as opposed to actual, time of one message passing from one fault interrupter to another.

Because it is necessary for the fault interrupter 38 to receive DoV messages from all of the immediate downstream fault interrupters, here the fault interrupters 40 and 52, there could be a reliability issue if for some reason all of these messages are not sent and/or are not received when they should be, where none of the fault interrupters would open in response to the fault 54. For example, if the DoV message from the fault interrupter 40 to the fault interrupter 38 was not received, then no fault interrupter would open in response to the fault 54. Specifically, a single communications breakdown may result in the breakdown of the operation when a fault happens. To handle this possible occurrence, another reliable protection scheme can be used as a backup in combination with the proposed permissive protection scheme. For example, a backup scheme can use the traditional TCC coordination, or a blocking scheme. The following discussion describes how the proposed permissive protection scheme can work with TCC coordination as a backup and with CEC protection as a backup.

Figure 3:
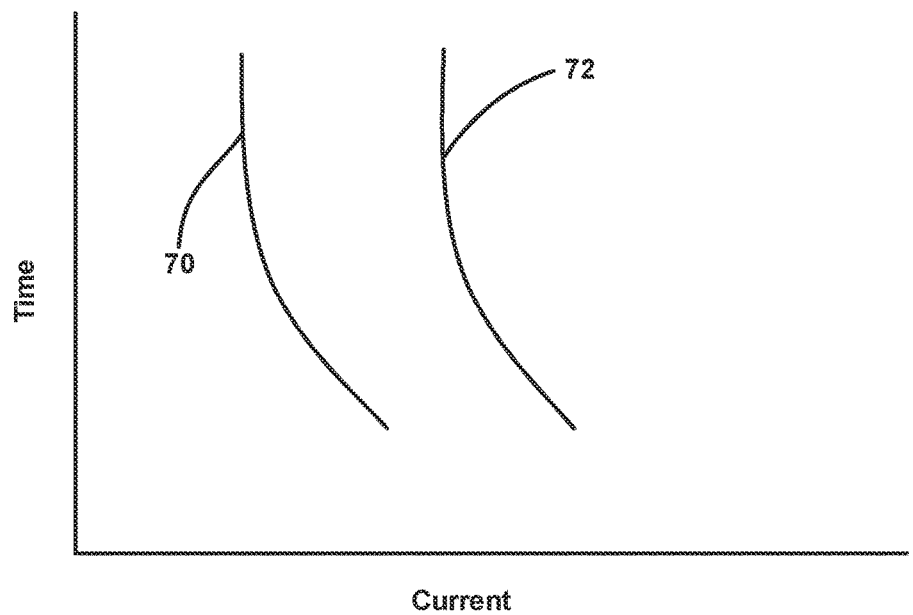
FIG. 3 is a graph with current on the horizontal axis and time on the vertical axis showing TCC curves for two fault interrupters.

FIG. 3 is a graph with current on the horizontal axis and time on the vertical axis. Graph line 70 is a TCC curve of a downstream fault interrupter and graph line 72 is a TCC curve of an upstream fault interrupter, which shows that the time it takes the particular fault interrupter to open in response to detecting a fault current value is less as the current increases, and the time it takes the downstream fault interrupter to open in response to a particular fault current is less than the time it takes the upstream fault interrupter to open. Once the downstream fault interrupter is opened, then the fault is removed from the upstream fault interrupter and it will not continue timing on its TCC curves thereafter, and will not open. Thus, by setting the TCC curves for the fault interrupters in this manner, there is fault current coordination between the fault interrupters without actual communication therebetween. Therefore, if the fault interrupters 36, 38, 40, 42, 50 and 52 are assigned TCC curves in this known manner to the extent it is possible to provide enough TCC curves for a particular feeder line, the fault interrupter 38, as the first fault interrupter upstream of the fault 54, will open first in response to the fault 54 when its TCC value is reached before the TCC value of the fault interrupter 36 if it does not open using the permissive protection scheme because of a problem with the messaging or the DoV messages arriving after its TCC value is reached.

For a CEC protection scheme, each fault interrupter is assigned two TCC curves, namely, an initial TCC curve and a shifted TCC curve, where all of the fault interrupters have the same initial TCC curves and the same shifted TCC curves. The initial TCC curve is slower than the maximum communication latency, i.e., is longer than one message transmission time, and the shifted TCC curve is slower than the initial TCC curve. Upon detection of a fault, all fault interrupters start timing on their initial TCC curve. When a fault interrupter detects a downstream fault, it sends a CEC message to its immediate upstream fault interrupter. If a fault interrupter detects the downstream fault and receives a CEC message from a downstream fault interrupter, it shifts its TCC curve from the initial TCC curve to the shifted TCC curve. Therefore, if the fault interrupter immediately upstream from the fault does not open under the permissive scheme discussed above, it will open using its initial TCC curve, and if it doesn't open under its initial TCC curve because of a hardware malfunction or otherwise, the next upstream fault interrupter will open using its shifted TCC curve. If any CEC message is not sent or received properly, the fault interrupters may not coordinate correctly. However, at least one fault interrupter upstream of the fault is guaranteed to trip open.

The network 30 can also be used to illustrate a protection system that uses a combination of the communication-based permissive protection scheme discussed above and the known CEC protection scheme. All of the fault interrupters 36, 38, 40, 42, 50 and 52 are assigned the same initial TCC curve that is longer than one message transmission time and a shifted TCC curve that is longer than the initial TCC curve. When the fault interrupter 38 detects the fault 54, it will send a CEC message on communication path 66 to the fault interrupter 36 identifying the detected fault, which causes the fault interrupter 36 to changes its TCC curve to the longer shifted TCC curve. Therefore, if the fault interrupter 38 does not open under the permissive scheme discussed above, it will open using its initial TCC curve, and if it doesn't open under its initial TCC curve, the fault interrupter 36 will open using its shifted TCC curve. More specifically, since the initial TCC curves of the fault interrupters 36, 38, 40, 42, 50 and 52 is slower than the maximum communication latency, if the DoV messages from the fault interrupters 40 and 52 to the fault interrupter 38 is successful, then the fault interrupter 38 will open before the initial TCC curve of the fault interrupter 38 expires. If any of the DoV messages to the fault interrupter 38 are lost due to message errors, then the fault interrupter 38 will open on its initial TCC curve, and the fault interrupter 36 will not open because it is operating on its shifted TCC curve due to the CEC message from the fault interrupter 38 to the fault interrupter 36. Therefore, loss of DoV messages may force the network 30 to operate on the backup CEC protection scheme, where although slower, the network 30 is still coordinated in this case, i.e., only the immediate upstream fault interrupter opens. On the other hand, if the CEC messages are lost due to message errors, but the DoV messages are successful, then the network 30 will operate on the permissive scheme as designed. If both the DoV messages and the CEC messages are lost, then the network 30 will not be coordinated. However, due to the use of known backup CEC mechanisms, at least one fault interrupter upstream of the fault 54 is still guaranteed to open, therefore the network 30 is reliable.

In addition to providing protection for components upstream of the fault as discussed above, the present disclosure also provides a technique for downstream fault isolation. For downstream fault isolation, it is desirable to open the fault interrupter immediately downstream of the fault so as to allow the loads downstream of that fault interrupter to receive power from a different source other than the source 32 if possible by closing a strategically positioned normally open fault interrupter. According to the disclosure, whenever a fault interrupter detects a fault, it sends an fault detection message to its immediate downstream fault interrupter. Further, that sending upstream fault interrupter may open to isolate the fault under the protection schemes discussed above. Therefore, the downstream fault interrupter that received the fault detection message will experience a complete loss of voltage (LoV) because the upstream fault interrupter opened. Whenever a fault interrupter detects a complete LoV and receives a fault detection message from its immediate upstream fault interrupter, the fault is between those two fault interrupters, and thus the downstream fault interrupter opens immediately to provide downstream fault isolation as discussed. The reason the fault interrupter needs to wait for a complete LoV as opposed to just a DoV before opening is in case the fault is on a different branch or on a fuse-protected lateral line. The speed of the proposed downstream fault isolation scheme is decided by the slower one of the speed of one message passing from the fault interrupter immediately upstream of the fault to the fault interrupter immediately downstream of the fault or the speed of the fault protection scheme for the fault interrupter immediately upstream of the fault. For three-phase bolted faults, the speed of this scheme is just the speed of one message passing from the immediate upstream fault interrupter to the immediate downstream fault interrupter. A three-phase bolted fault may be seen as a complete LoV by the downstream fault interrupter before it is cleared by the upstream fault interrupter. However, this will be the case only if the fault is in the immediately upstream section, and not on a bifurcated feeder line, where it is acceptable for the downstream fault interrupter to open.

Figure 4:
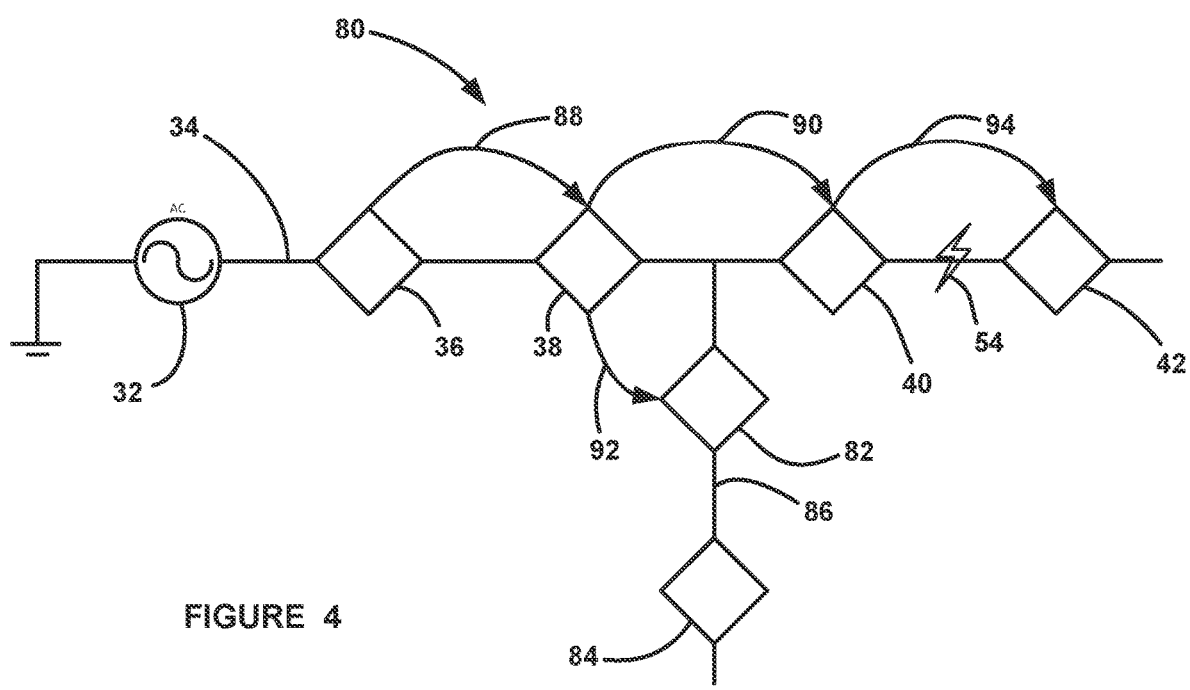
FIG. 4 is a schematic type diagram of an electrical power distribution network including fault interrupters positioned on a feeder line, where a fault is shown on the feeder line, and illustrating a downstream fault isolation scheme for opening a first fault interrupter downstream the fault.

FIG. 4 is a schematic type diagram of an electrical power distribution network 80 illustrating this described downstream fault isolation scheme, where like elements to the network 30 are identified by the same reference number. In this example, the fault 54 occurs between the fault interrupters 40 and 42 on the line 34. Also, fault interrupters 82 and 84 are provided on a feeder line 86 that is electrically coupled to the feeder line 34 between the fault interrupters 38 and 40. When the fault 54 occurs, the fault interrupter 36 sends a fault detection message to the fault interrupter 38 on communication path 88, the fault interrupter 38 sends a fault detection message to the fault interrupter 40 on communication path 90 and a fault detection message to the fault interrupter 82 on communication path 92, and the fault interrupter 40 sends a fault detection message to the fault interrupter 42 on communication path 94. Also, when the fault 54 occurs, the fault interrupter 42 experiences LoV when the fault interrupter 40 opens under the downstream fault protection scheme, and the fault interrupters 82 and 84 experience a DoV. In this situation, the fault interrupter 42 will open because it knows its immediate upstream section is faulted after it detects the LoV and receives the fault detection message from the fault interrupter 40. Therefore, the downstream fault isolation scheme is faster than known downstream fault isolation schemes because the fault interrupter 42 will open as soon as it receives the LoV message, and does not need to wait until it receives an open message from the fault interrupter 40 as was done in the known networks. The fault interrupter 82 will not mistakenly decide that its immediate upstream section is faulted because it will initially detect a DoV, but healthy voltage returns after the DoV, since the fault interrupter 40 will interrupt the fault 54. Note that if the fault interrupter 82 is adjacent to the fault interrupter 40, and the fault 54 is a three-phase bolted fault that is very close to the fault interrupter 40, it is possible that the fault interrupter 82 will detect almost a complete loss of voltage that may be registered as a LoV.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A communication-based permissive protection method for protecting an electrical power distribution network from an electrical fault in the network, the method comprising:
    providing a power source that provides a power signal;
    providing a plurality of fault interrupters on one or more electrical lines in the network each receiving the power signal;
    detecting the fault on one of the electrical lines by each fault interrupter that is between the fault and the power source;
    sending a drop of voltage message from each fault interrupter that detects a drop of voltage without indication of a fault further downstream as a result of the fault to its immediate upstream fault interrupter towards the power source;
    sending a fault detection message from each fault interrupter that detects the fault to an immediate upstream fault interrupter, wherein receiving the fault detection message causes the fault interrupter to change its TCC curve from an initial TCC curve to a shifted TCC curve so that a fault interrupter that detects the fault but does not receive a fault detecting message will open based on its initial TCC curve and a fault interrupter that detects the fault and does receive a fault detecting message will open based on its shifted TCC curve; and
    opening the fault interrupter that both detects the fault downstream and receives a drop of voltage message from all of the fault interrupters immediately downstream of that fault interrupter.

2. The method according to claim 1 wherein opening the fault interrupter includes opening the fault interrupter at a message transmission time as defined by the time of transmission of the drop of voltage messages.

3. The method according to claim 2 wherein each fault interrupter is assigned a time-current characteristic (TCC) curve that determines when the fault interrupter will open in response to detecting the fault downstream, wherein for a particular fault interrupter its TCC curve is longer the closer the fault interrupter is to the power source.

4. The method according to claim 1 wherein the shifted TCC curve is the same for all of the fault interrupters.

5. The method according to claim 1 wherein the one or more electrical lines is a plurality of electrical lines where some of the fault interrupters may be on one electrical line and other fault interrupters may be on other electrical lines, and wherein a particular fault interrupter may receive drop of voltage messages from fault interrupters on different electrical lines.

6. The method according to claim 1 wherein the fault interrupters are mounted on a utility pole or in underground circuit switchgear.

7. The method according to claim 1 wherein the one or more electrical lines are feeder lines.

8. The method according to claim 1 wherein the electrical power distribution network is a medium voltage electrical power distribution network and the power source is an electrical substation or a distributed energy resource.

9. The method according to claim 1 wherein the electrical power distribution network is a non-radial or closed-loop circuit having two or more sources.

10. A method for providing fault isolation from a fault in an electrical power distribution network, the method comprising:
    providing a power source that provides a power signal;
    providing a plurality of fault interrupters on one or more electrical lines in the network each receiving the power signal;
    detecting the fault by each fault interrupter that is between the fault and the power source;
    sending a fault detection message from each fault interrupter that detects the fault to its immediate downstream fault interrupters from the power source, wherein receiving the fault detection message causes the fault interrupter to change its TCC curve from an initial TCC curve to a shifted TCC curve so that a fault interrupter that detects the fault but does not receive a fault detecting message will open based on its initial TCC curve and a fault interrupter that detects the fault and does receive a fault detecting message will open based on its shifted TCC curve;
    opening one of the fault interrupters upstream of the fault under a predetermined fault protection scheme;
    detecting a loss of voltage by a fault interrupter immediately downstream of the fault interrupter that was opened; and
    opening the downstream fault interrupter that received the fault detection message and detected loss of voltage.

11. The method according to claim 10 wherein opening one of the fault interrupters upstream of the fault under a predetermined fault protection scheme includes using a fault protection scheme that is based on a communication-based permissive protection scheme that employs fault detection messages and drop of voltage messages sent by the fault interrupters.

12. The method according to claim 10 wherein opening one of the fault interrupters upstream of the fault under a predetermined fault protection scheme includes using a fault protection scheme that is based on a communication enhanced coordination (CEC) protection scheme that employs fault detection messages and the shifted time-current characteristic (TCC) curves.

13. The method according to claim 10 wherein opening one of the fault interrupters upstream of the fault includes opening the fault interrupter immediately upstream of the fault.

14. The method according to claim 10 wherein the fault interrupters are mounted on a utility pole or in an underground circuit.

* * * * *